United States Patent
Wang et al.

(10) Patent No.: US 10,554,763 B2
(45) Date of Patent: Feb. 4, 2020

(54) METHOD AND APPARATUS FOR VIRTUAL BASE STATION MIGRATION IN BBU POOL

(71) Applicant: Alcatel Lucent, Boulogne Billancourt (FR)

(72) Inventors: Cheng Wang, Shanghai (CN); Yun Deng, Shanghai (CN); Liyu Cai, Shanghai (CN)

(73) Assignee: ALCATEL LUCENT, Nozay (FR)

( * ) Notice: Subject to any disclaimer, the term of this patent is extended or adjusted under 35 U.S.C. 154(b) by 91 days.

(21) Appl. No.: 15/307,527

(22) PCT Filed: Apr. 10, 2015

(86) PCT No.: PCT/IB2015/000634
§ 371 (c)(1),
(2) Date: Oct. 28, 2016

(87) PCT Pub. No.: WO2015/166336
PCT Pub. Date: Nov. 5, 2015

(65) Prior Publication Data
US 2017/0054817 A1    Feb. 23, 2017

(30) Foreign Application Priority Data

Apr. 29, 2014 (CN) .......................... 2014 1 0177997
Oct. 30, 2014 (CN) .......................... 2014 1 0605357

(51) Int. Cl.
*H04L 29/08* (2006.01)
*H04W 76/28* (2018.01)
(Continued)

(52) U.S. Cl.
CPC ....... *H04L 67/148* (2013.01); *H04W 72/0446* (2013.01); *H04W 74/0833* (2013.01); *H04W 76/28* (2018.02); *H04W 88/085* (2013.01)

(58) Field of Classification Search
CPC ..... H04W 16/32; H04W 48/20; H04W 76/10; H04W 76/28; H04W 74/0833;
(Continued)

(56) References Cited

U.S. PATENT DOCUMENTS

| | | | | |
|---|---|---|---|---|
| 2008/0020801 | A1* | 1/2008 | Fesas | H04W 28/18 455/561 |
| 2008/0069088 | A1* | 3/2008 | Petrovic | H04W 36/22 370/354 |

(Continued)

FOREIGN PATENT DOCUMENTS

| | | |
|---|---|---|
| CN | 101267249 A | 9/2008 |
| CN | 101321393 A | 12/2008 |

(Continued)

OTHER PUBLICATIONS

Cheng Wang et al., "A Study on Virtual BS Live Migration—A Seamless and Lossless Mechanism for Virtual BS Migration," 2013 IEEE 24th Annual International Symposium on Personal, Indoor and Mobile Radio Communications, pp. 2803-2807, XP055225133, 2013.

(Continued)

*Primary Examiner* — Will W Lin
(74) *Attorney, Agent, or Firm* — Fay Sharpe LLP (57) ABSTRACT

The present invention discloses a method and an apparatus for a virtual base station migration in a BBU pool which has multiple baseband units. The migration method comprises the following steps performed by a first virtual base station: measuring an available bandwidth between the first virtual base station and a second virtual base station, wherein the first virtual base station and the second virtual base station belong to different baseband units in the BBU pool; estimating a service interruption time of the first virtual base station; selecting a migration mechanism of the first virtual base station according to the estimated service interruption
(Continued)

time. The migration mechanism comprises configuring a common measurement gap for user devices of the first virtual base station, or configuring random access time slots for user devices of the first virtual base station, or configuring a discontinuous receiving cycle for user devices of the first virtual base station. The solution of the present invention enables user devices in a connected state not to be influenced by a migration during the service interruption and achieve a lossless migration between virtual base stations.

13 Claims, 3 Drawing Sheets

(51) Int. Cl.
*H04W 72/04* (2009.01)
*H04W 74/08* (2009.01)
*H04W 88/08* (2009.01)

(58) Field of Classification Search
CPC ............. H04W 72/0446; H04W 24/02; H04W 88/085; H04L 25/00; H04L 67/148; H04L 43/08; H04L 43/16
See application file for complete search history.

(56) References Cited

U.S. PATENT DOCUMENTS

| | | | |
|---|---|---|---|
| 2009/0191874 A1* | 7/2009 | Du | H04W 36/18 455/436 |
| 2013/0183991 A1 | 7/2013 | Bosch et al. | |
| 2015/0036664 A1* | 2/2015 | Yuk | H04W 36/30 370/332 |
| 2016/0192181 A1* | 6/2016 | Choi | H04B 7/26 455/422.1 |

FOREIGN PATENT DOCUMENTS

| | | |
|---|---|---|
| EP | 2 717 158 A1 | 4/2014 |
| JP | 2013-541289 A | 11/2013 |

OTHER PUBLICATIONS

International Search Report for PCT/IB2015/000634 dated Nov. 19, 2015.

* cited by examiner

METHOD AND APPARATUS FOR VIRTUAL BASE STATION MIGRATION IN BBU POOL

FIELD OF THE INVENTION

The present invention relates to wireless communication field, and more particularly relates to a method and an apparatus for a virtual base station migration in a BBU (baseband unit) pool.

BACKGROUND OF THE INVENTION

C-RAN (RAN: Radio Access Network) has been considered as a solution for future cellular wireless communication which can address many challenges the operators are facing, such as large number of base stations, high power consumption, rapidly increased CAPEX/OPEX, low base station utilization rate, etc. C-RAN is mainly characterized by the centralized BBU pool and the distributed RRHs.

As a common used means of supporting a plurality of base stations independent from each other within a multi-core hardware unit, the virtualization technology allocates sufficient computer resources to individual virtual base stations in accordance with requirements of respective air interface standards to ensure mutual independence of individual virtual base stations at the operating system level.

The virtual base station live migration is a new technology that emerged from C-RAN, which can reduce the power consumption of the C-RAN BBU pool. It has been observed that the workload in a base station is very low during the latter half of the night. Although the base station handles very low workload, it consumes almost the same level of energy as it does in busy hours. Thus, if multiple virtual base stations can be migrated onto a single BBU (Baseband Unit), the idle BBUs may be shutdown, resulting in reduced power consumption of the BBU pool.

In order to achieve a lossless virtual base station dynamic migration, necessary control-plane and user-plane data needs to be forwarded from the source base station to the target base station. Some of the necessary information can be treated in a similar way to a cell handover. For example, the Packet Data Convergence Protocol Service Data Unit (PDCP SDU) buffered data and the PDCP Sequence Number (PDCP SN) in Radio Link Controller-Acknowledged Mode: Data Radio Bearer (RLC-AM: DRB) should be restored at the target base station; user device contexts should be transmitted from the source base station to the target base station, and the user device contexts include user device (UE)/authentication server (AS) Security Information, E-RABs (Radio Access Bearer) information, RRC contexts, etc. In order to reduce the impacts of a base station migration on user devices, some extra user device context information also needs to be transmitted from the source base station to the target base station. This extra user device context information includes: PDCP SDUs buffered data and PDCP SN of RLC-UM DRB (UM: Unacknowledged Mode); the keys ($K_{eNB}$) of the source base station; RLC contexts and the buffered data of RLC PDU/SDUs; HARQ (Hybrid Automatic Repeat Request) configuration and state, and HARQ buffered data; cell specific parameters such as MIB (Mater Information Block), SIB1-6 (System Information Block), etc. Even so, the detailed information needed to be forwarded to the target base station is not the subject of this invention.

As all the baseband units are in the same BBU pool and are connected with each other by high speed fixed network, the latency between virtual base stations is far lower than the traditional backhaul latency, which facilitates the data exchange between the source base station and the target base station and makes a seamless base station migration possible.

In principle, user devices always suffers from a service interruption when a running virtual base station migrates from one BBU to another, which is caused by the suspension of the source base station in the source BBU, the transfer of the necessary parameters and data from the source base station to the target base station, and the user device context restoration and the activation of the target base station in the target BBU. During the service interruption, neither the source base station nor the target base station serves the user devices. If a user device doesn't receive any Physical Downlink Control Channel (PDCCH) signaling during a period of time, the user device does not know what happens and it may trigger a Radio Resource Control (RRC) re-establishment which may lead to broken services. Thus, in the present invention, it is presented a dynamic mechanism to enable user devices not to be influenced during the service interruption, and ensure the user devices to be served as soon as possible after the migration is completed and guarantee the user device services are not broken.

SUMMARY OF THE INVENTION

According to the above understanding of the background and the existing technical problems, it would be very beneficial to provide a method and an apparatus for a virtual base station migration in a BBU pool to achieve a lossless dynamic migration.

According to a first aspect of the present invention, there is provided a method for a virtual base station migration in a BBU pool which has multiple baseband units. The method comprises the following steps performed by a first virtual base station: A. measuring an available bandwidth between the first virtual base station and a second virtual base station, wherein the first virtual base station and the second virtual base station belong to different baseband units in the BBU pool; B. estimating a service interruption time of the first virtual base station; C. selecting a migration mechanism of the first virtual base station according to the estimated service interruption time.

According to an embodiment of the present invention, the migration mechanism of step B includes: configuring a common measurement gap or random access time slots or a discontinuous receiving cycle for user devices of the first virtual base station, when the estimated service interruption time is lower than or equal to a first threshold; configuring random access time slots or a discontinuous receiving cycle for user devices of the first virtual base station, when the estimated service interruption time is higher than the first threshold and lower than or equal to a second threshold; and configuring a discontinuous receiving cycle for user devices of the first virtual base station, when the estimated service interruption time is higher than the second threshold.

According to an embodiment of the present invention, before step A it is further comprised receiving a migration preparation message from a migration manager. The migration preparation message is used to trigger the first virtual base station to measure the available bandwidth between the first virtual base station and the second virtual base station and to initiate the second virtual base station.

According to an embodiment of the present invention, before step B it is further comprised: i. sending, in accordance with the measured available bandwidth, to the migration manager a migration preparation acknowledgement message for confirming to the migration manager that the first virtual base station is ready for the migration; and ii. receiving from the migration manager a migration command message for triggering the migration of the first virtual base station to the second virtual base station.

According to an embodiment of the present invention, wherein step B further comprises estimating the service interruption time of the first virtual base station in accordance with the number of user devices of the first virtual base station, the data rate of the user devices of the first virtual base station and the available bandwidth.

According to an embodiment of the present invention, wherein after step C it is further comprised sending to the second virtual base station a migration request which comprises the control plane and user plane data of the first virtual base station for the migration, wherein the migrator request causes the second virtual base station to restore the context data and buffered data of the user devices of the first virtual base station; and sending to the migration manager a migration completion message for informing the migration manager that the migration of the first virtual base station to the second virtual base station is completed.

According to a second aspect of the present invention, there is provided a method for a virtual base station migration in a BBU pool which has multiple baseband units. The method comprises the following steps performed by a migration manager: collecting a resource usage rate of the baseband units in the BBU pool; making, in accordance with the collected resource usage rate and a migration threshold, a migration decision comprising determining a first virtual base station and a second virtual base station, wherein the first virtual base station and the second virtual base station belong to different baseband units in the BBU pool; sending a migration preparation message to the first virtual base station and the second virtual base station to trigger the first virtual base station to measure an available bandwidth between the first virtual base station and the second virtual base station; receiving a migration preparation acknowledgement message from the first virtual base station and the second virtual base station; sending to the first virtual base station a migration command message for triggering the migration of the first virtual base station to the second virtual base station; and receiving migration completion messages from the first virtual base station and the second virtual base station.

According to an embodiment of the present invention, it is further comprised presetting the migration threshold or configuring the migration threshold in accordance with the collected resource usage rate.

According to an embodiment of the present invention, it is further comprised sending the migration preparation message to the first virtual base station when the resource usage rate of the baseband units of the first virtual base station is lower than the migration threshold.

According to a third aspect of the present invention, there is provided an apparatus for implementing a virtual base station migration in a BBU pool which has multiple baseband units. The apparatus comprises: a measuring unit for measuring an available bandwidth between a first virtual base station and a second virtual base station, wherein the first virtual base station and the second virtual base station belong to different baseband units in the BBU pool; an estimating unit for estimating a service interruption time of the first virtual base station in accordance with the number of user devices of the first virtual base station, the data rate of the user devices of the first virtual base station and the measured available bandwidth; and a selecting unit for selecting a migration mechanism of the first virtual base station in accordance with the estimated service interruption time.

According to an embodiment of the present invention, the migration mechanism comprises configuring a common measurement gap or random access time slots or a discontinuous receiving cycle for user devices of the first virtual base station, when the estimated service interruption time is lower than or equal to a first threshold; configuring random access time slots or a discontinuous receiving cycle for user devices of the first virtual base station, when the estimated service interruption time is higher than the first threshold and lower than or equal to a second threshold; and configuring a discontinuous receiving cycle for user devices of the first virtual base station, when the estimated service interruption time is higher than the second threshold.

According to an embodiment of the present invention, it is further comprised a first receiving unit for receiving from a migration manager a migration preparation message for triggering the first virtual base station to measure the available bandwidth between the first virtual base station and the second virtual base station.

According to an embodiment of the present invention, it is further comprised a first transmitting unit for sending, in accordance with the measured available bandwidth, to the migration manager a migration preparation acknowledgement message for confirming to the migration manager that the first virtual base station is ready for the migration; and a second receiving unit for receiving from the migration manager a migration command message for triggering the migration of the first virtual base station to the second virtual base station.

According to an embodiment of the present invention, it is further comprised a second transmitting unit for sending to the second virtual base station a migration request comprising the control plane and user plane data of the first virtual base station for the migration, wherein the migrator request causes the second virtual base station to restore the context data and buffered data of user devices of the first virtual base station; and a third transmitting unit for sending to the migration manager a migration completion message for informing the migration manager that the migration of the first virtual base station to the second virtual base station is completed.

According to a fourth aspect of the present invention, there is provided an apparatus for implementing a virtual base station migration in a BBU pool which has multiple baseband units. The apparatus comprises: a collecting unit for collecting a resource usage rate of the baseband units in the BBU pool; a determining unit for making, in accordance with the collected resource usage rate and a migration threshold, a migration decision comprising determining a first virtual base station and a second virtual base station, wherein the first virtual base station and the second virtual base station belong to different baseband units in the BBU pool; a first transmitting unit for sending a migration preparation message to the first virtual base station and second virtual base station to trigger the first virtual base station to measure the available bandwidth between the first virtual base station and the second virtual base station and to initiate the second virtual base station, and sending the migration preparation message to the first virtual base station when the resource usage rate of the baseband units of the first virtual base station is lower than the migration threshold; a first receiving unit for receiving a migration preparation acknowledgement message from the first virtual base station and the second virtual base station; a second transmitting unit for sending to the first virtual base station a migration command message for triggering the migration of the first virtual base station to the second virtual base station; and a third receiving unit for receiving migration completion messages from the first virtual base station and/or the second virtual base station.

According to an embodiment of the present invention, it is further comprised presetting the migration threshold or configuring the migration threshold in accordance with the collected resource usage rate.

According to the contents disclosed by the present invention, a method and an apparatus for a virtual base station migration in a BBU pool is presented. The distinctive advantage of the present invention is enabling user devices not to be influenced by a migration during a service interruption time, ensuring the user devices to be served as soon as possible after the migration is completed, and guaranteeing the services of the user devices are not broken so as to achieve a lossless base station migration.

BRIEF DESCRIPTION OF THE DRAWINGS

Other features, objectives and advantages of the present invention will become more apparent by reading the following detailed description of the non-limiting embodiments with references to the accompanying drawings.

In the drawings, the same or similar reference number represents the same or like apparatus (module) or step throughout different diagrams.

DETAILED DESCRIPTION OF EMBODIMENTS

In the detailed description of the following preferred embodiments, references will be made to accompanying drawings. By way of example, the accompanying drawings show particular embodiments capable of implementing the present invention. The exemplary embodiments are not intended to exhaust all the embodiments according to the present invention. It may be understood that other embodiments may be employed and structural or logical amendment may be made without departing from the scope of the present invention. Thus, the following detailed description is non-limiting and the scope of the present invention is defined by the appended claims. It should be noted that although steps of a method of the present invention are described in a specific order in the figures, it does not require or suggest that these operations are necessarily performed in this specific order, or the expected result can be obtained only if all the shown operations are performed. Instead, the steps described herein may change the execution order. Additionally or alternatively, some steps may be omitted, multiple steps may be combined as one step to perform, and/or one step may be decomposed into multiple steps to perform.

To facilitate understanding of the present invention, some concepts are explained as follows:

BBU pool: A BBU pool comprises at least more than one baseband unit. In a BBU pool, the baseband capacity is shared and the baseband resource is dynamically allocated to achieve traffic scheduling.

Baseband unit (BBU): Each BBU may at least implement one or more virtual base stations.

Virtual base station: A logic entity realized based on threads/processes or virtual machines. Protocol stacks supporting e.g. LTE air interface standard or air interface standard protocol stacks of other wireless communication technologies are running thereon.

Source base station: A base station that will be migrated is referred to as a source base station.

Target base station: A base station that will take over all the serving virtual base stations provided by a source base station is referred to as a target base station.

Service interruption time: The service interruption time is defined from the user's perspective, that is, the interval between the time when a user device receives the last packet from a source base station and the time when the user device receives the first packet from a target base station.

User devices in the connected state: refer to user devices that have already established a RRC connection.

Virtual base station live migration is an advantageous technology for reducing the power consumption of a C-RAN BBU pool. In principle, a service interruption time is unavoidable when a running base station migrates from one BBU to another, which is caused by the suspension of base stations in the source BBU, the forwarding of control-plane and user-plane data between the source and the target base stations, and the activation of base stations in the target BBU. For a well-designed system, analysis shows that the service interruption time is dominated by the time of data forwarding between a target base station and a source base station.

The data forwarding time is determined by the forwarded data volume and an available bandwidth for data forwarding. The user-plane data volume needed to be forwarded depends on the number of online users and the user's traffic type, both of which vary in time. The control-plane data needed to be forwarded includes user device related parameters and cell related parameters, and the user device related control-plane data volume also depends on the dynamically changeable number of user devices in the connected state. Moreover, an available bandwidth between the source and target base stations may vary in time, which leads to variation in X2 interface latency.

Based on the above analysis, the service interruption time/data forwarding time varies dynamically in a practical system. During the service interruption time, neither the source base station nor the target base station serves the user devices which may lower the user experience of the user devices. If a user device doesn't receive e.g. any PDCCH signaling during a period, it may trigger RRC re-establishment and lead to broken services.

In order to ensure the user devices not to be influenced during the service interruption time, and ensure the user devices to be served as soon as possible after the migration is completed and guarantee the user device services are not broken, a dynamic mechanism is proposed to satisfy these requirements. Embodiments of the present invention will be illustrated with the source base station as a first virtual base station and the target base station as a second virtual base station.

Figure 1:
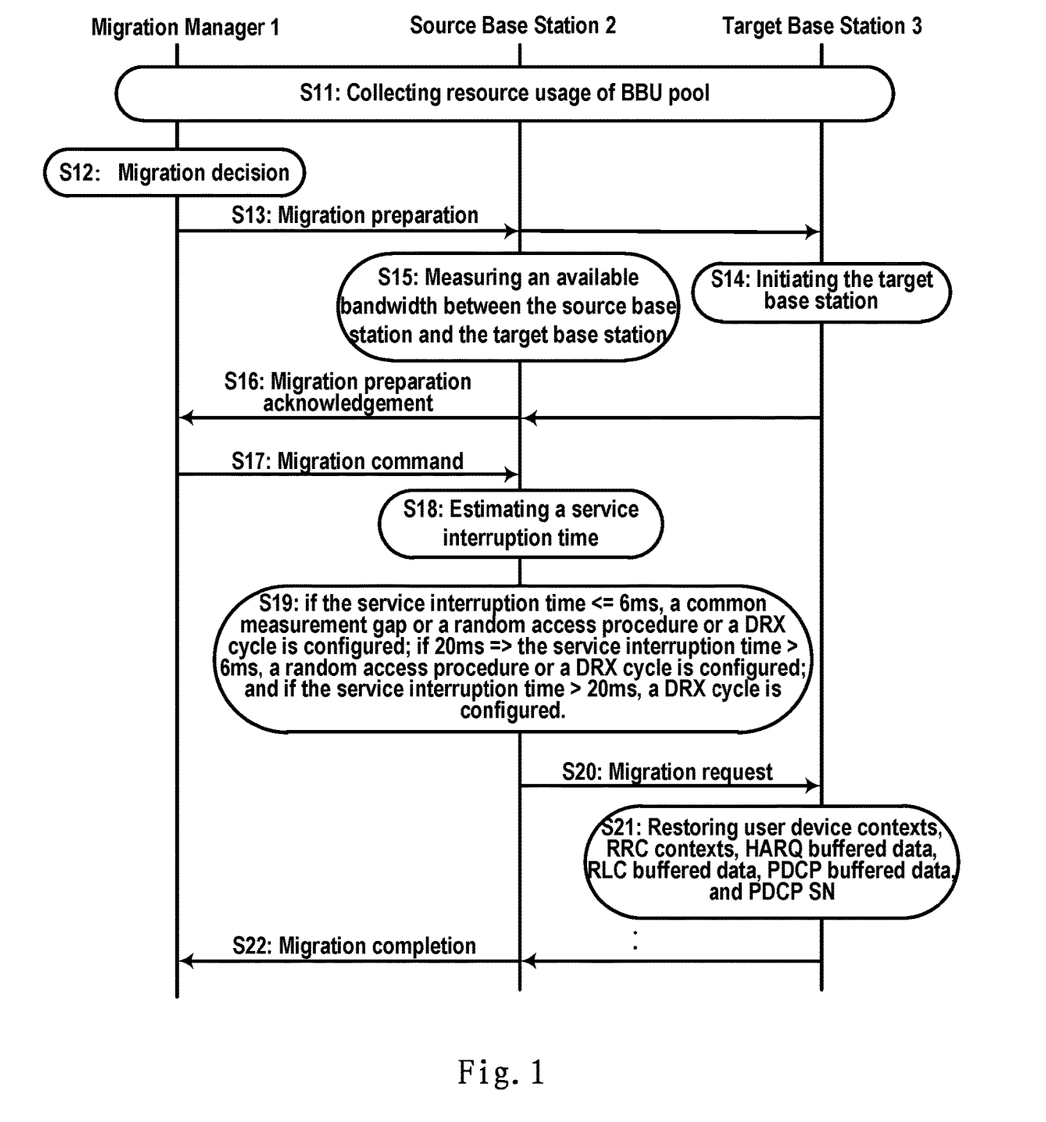
FIG. 1 shows a flowchart of a lossless virtual base station migration.

FIG. 1 shows a flowchart of a virtual base station lossless migration. As shown in FIG. 1, in step S11, a migration manager 1 determines the resource usage rate of each BBU and/or virtual base stations by collecting resource usage information of each BBU and/or virtual base stations periodically from a management program/or virtual base stations.

In step S12, the migration manager 1 makes a migration decision based on the resource usage information from each virtual base station. The migration manager 1 presets a migration threshold or configures the migration threshold according to the collected resource usage rate. For example, by collecting resource usage information of each BBU and/or virtual base stations periodically from the management program/or virtual base stations, the migration manager 1 determines the source base station 2 needed to be migrated and thus generates a migration decision of the source base station 2, based on the collected resource usage information and the preset or configured migration threshold, for example, when the resource usage rate of the baseband units of the source base station 2 is lower than the migration threshold. For another example, when other BBUs different from the BBUs corresponding to the source base station 2 have sufficient available resources, then said BBUs are determined to be the BBUs that can accept the source base station, and a target base station 3 for accepting the migration of the source base station is determined on said BBUs. Those skilled in the art may understand that it may be the migration manager to obtain a migration request regarding a source base station sent by the source base station, i.e., the migration request is generated by the source base station according to its own resource usage information, and sends the migration request to the migration manager through a predetermined communication protocol.

In step S13, the migration manager 1 sends a migration preparation message to the source base station 2 and the target base station 3 respectively. The migration preparation message is used for triggering the source base station 2 to measure the available bandwidth between the source base station 2 and the target base station 3 and initiating the target base station.

In step S14, the target base station 3 performs the initiation. The initiation comprises initializing the protocol stack of the target base station 3, establishing S1/X2 connections with other base stations, and establishing an uplink GTP tunnel (GTP, GPRS Tunneling Protocol) with a service gateway (S-GW).

In step S15, the base station 2 estimates the available bandwidth between the source base station 2 and the target base station 3.

In step S16, the source base station 2 and the target base station 3 respectively sends a migration preparation acknowledgement message to the migration manager 1. The migration preparation acknowledgement message is used for confirming to the migration manager 1 that source base station 2 and the target base station 3 are ready for the migration.

In step S17, the migration manager 1 sends a migration command to the source base station 2. The migration command is used for triggering the migration of the source base station 2 to the target base station 3.

In step S18, the source base station 2 estimates the service interruption time. For a well-designed system, the service interruption time is determined by the required data forwarding time of the transmission of control-plane and user-plane data between the source base station 2 and the target base station 3. The source base station 2 calculates the required data forwarding time and thus estimates the service interruption time based on the number of user devices served by the source base station 2 as well as the data rate and available bandwidth of each user device. Experiments and analysis show that the typical range of the service interruption time is from several milliseconds to tens of milliseconds, depending on specific implementing cases and the data volume needed to be forwarded.

Alternatively, from the perspective of signaling design, according to the data volume to be forwarded and the estimated available bandwidth, the calculation of the service interruption time may also be performed by the migration manager.

In step S19, the source base station 2 selects its migration mechanism according to the estimated service interruption time. When the service interruption time is lower than or equal to a first threshold, for instance, the first threshold is 6 milliseconds, the source base station 2 configures a measurement gap or random access time slots or a discontinuous receiving cycle for its user devices; when the service interruption time is higher than the first threshold and lower than or equal to a second threshold, the source base station 2 configures random access time slots or a discontinuous receiving cycle for its user devices; and when the service interruption time is higher than the second threshold, for instance, the second threshold is 20 milliseconds, the source base station 2 configures a discontinuous receiving (DRX) cycle for its user devices, wherein the configured measurement gap or the random access procedure or the discontinuous receiving cycle is typically greater than the estimated service interruption time.

Specifically, the migration selection mechanism of the source base station is illustrated with the example that the first threshold is 6 milliseconds and the second threshold is 20 milliseconds.

Figure 2:
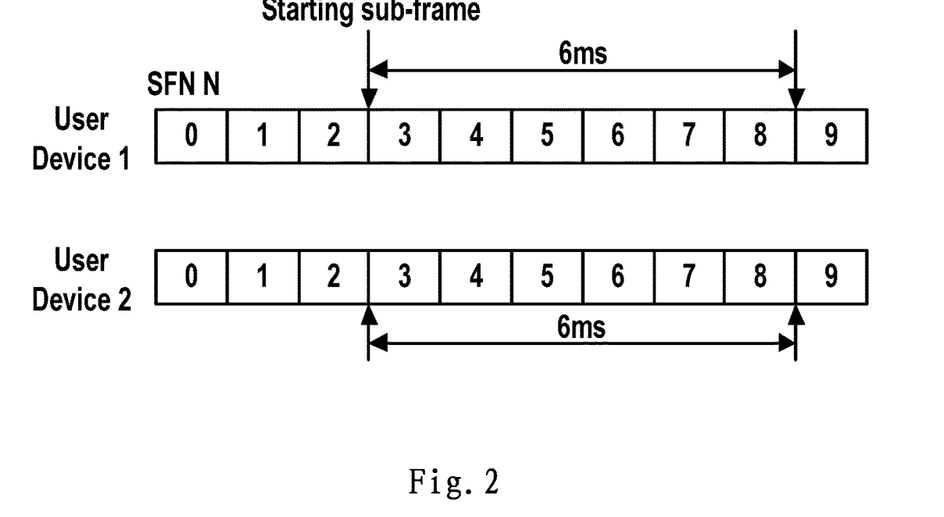
FIG. 2 shows a schematic diagram of a measurement gap.

When the estimated service interruption time is less than 6 milliseconds, the source base station 2 configures a measurement gap for its user devices in the connected state. Typically, the measurement gap is configured by the network for a user device in the connected state to perform an inter-frequency or inter-system measurement when the channel quality of the serving cell is not good enough. During this period, the user device should tune its radio frequency receiver to perform the inter-frequency or inter-system frequency measurement, and no uplink or downlink transmissions are performed for the user device. When the migration manager 1 makes a migration decision, the source base station 2 may configure a common measurement gap for all the user devices in the connected state even if the channel quality of the serving cell of the source base station is good. The common measurement gap means that different user devices in the connected state are all configured with a measurement gap having the same starting sub-frame as shown in FIG. 2, i.e., the user device 1 and the user device 2 have the same measurement gap.

When the estimated service interruption time is less than 6 milliseconds, the source base station 2 configures for all its user devices in the connected state a common measurement gap from sub-frame 3 of the system frame number (SFN) N to sub-frame 8 of the SFN N. At the beginning of the sub-frame 3 of the SFN N (see FIG. 2), the source base station 2 initiates the migration immediately. That is, the source base station 2 sends the context and the corresponding buffered data of all its user devices in the connected state to the target base station, and the target base station 3 receives and restores this information. During the migration, the user devices in the connected state perform the inter-frequency or inter-system measurement, and the migration is not influenced. The target base station 3 takes over the source base station 2 before sub-frame 9 of SFN N, and may communicate with user devices from sub-frame 9.

Alternatively, when the estimated service interruption time is less than 6 milliseconds, the source base station 2 may also configure random access time slots or a discontinuous receiving cycle for its user devices in the connected state. When the estimated service interruption time is less than 6 milliseconds, and if the measurement gap or the random access time slots or the discontinuous receiving are all feasible schemes, the source base station 2 selects one scheme of them to configure for its user devices in the connected state.

When the estimated service interruption time is greater than 6 milliseconds and less than or equal to 20 milliseconds, the source base station 2 configures random access time slots for its user devices in the connected state. For example, a random access sub-frame may be configured every 20 milliseconds. When the current configured random access time slots are already 20 milliseconds, the source base station 2 does not need to re-configure random access time slots for its user devices in the connected state. The source base station 2 may trigger the user devices in the connected state to perform a random access procedure through Downlink Control Information (DCI) to obtain UL synchronization. Once receiving a random access triggering instruction sent from the source base station 2, the user devices in the connected state begin to perform the random access procedure and send a preamble to the target base station in the serving cell in the sub-frame of the configured random access channel. Triggering the user devices in the connected state to perform the random access procedure will not have impact on current RRC connections of the user devices, i.e. the user devices in the connected state still maintain the RRC connections with the network, and the already-established radio bearers of the user devices in the connected state are also remaining. After finishing the random access procedure, the user devices in the connected state may continue its service without data loss. According to the current specification, there may be different FDD random access configurations as listed in Table 1. It may be seen from the Table 1 that a random access sub-frame may be configured every 20 milliseconds. If source the base station 2 configures such a random access sub-frame, after the source base station 2 triggers the user devices in the connected state to perform a random access procedure, the user devices in the connected state may wait up to 20 milliseconds. The source base station 2 may utilize this period to perform a migration. So if the source base station 2 judges that the service interruption time is less than 20 milliseconds, it may configure this type of random access resources.

TABLE 1

Physical Random Access Channel (PRACH)
Configuration Parameters for FDD

| PRACH Configuration Index | Preamble Format Index | System frame number Odd/Even | Sub-frame index |
|---|---|---|---|
| 32 | 2 | Even | 1 |
| 33 | 2 | Even | 4 |
| 34 | 2 | Even | 7 |

After the source base station 2 triggers all the user devices in the connected state to perform a random access procedure, it immediately initiates a migration and starts data forwarding to the target base station 3. During the period when the user devices in the connected state wait to perform random access, the source base station 2 sends all the user device contexts and the corresponding necessary buffered data to the target base station 3, and the target base station 3 receives and restores this information. The target base station 3 may take over the source base station 2 and receives preambles from user devices. Because base station migrations always occurs on idle hours and there are a small number of user devices in the connected state served by the source base station 2, that these user devices in the connected state perform random access procedures generally will not result in a random access failure. After the random access procedures, these user devices in the connected state may continue to carry out their services. So these user devices in the connected state will not be influenced by base station migrations.

The random access procedures may fail under some specific conditions: for example, many user devices perform random access procedures simultaneously within a very short time, users suffer from bad channel conditions, etc. In this invention, there may also be a new scenario for a random access failure, i.e., the scenario that the target base station has not been prepared and cannot take over the source base station in time. In order to deal with the potential random access failure, the following solutions may be adopted (they may be used in combination or individually):

1) The source base station 2 configures the maximum number (more than one) of preamble transmissions for the user devices in the connected state. If the user devices in the connected state do not reach the maximum number of preamble transmissions, they should continue performing random access procedures. For example, if the maximum number of preamble transmissions is 5, there is enough time for a migration.

2) Before a migration, the source base station 2 sends all the user device contexts to its neighboring base stations. During the migration procedure, if a user device suffers from a random access failure, neighboring cells managed by neighboring base stations may be selected to attempt a RRC re-establishment. Because the neighboring base stations already have obtained the all the user device contexts, the RRC re-establishment will succeed. After the RRC re-establishment, the user devices in the connected state may continue their service.

3) A user device is informed of a migration through an enhanced radio interface. Even if the target base station 3 has not prepared to take over the source base station, a user device in the connected state may also timely notice the migration that will occur, and may wait for a period until it detects a transmission signal such as a cell specific reference signal. Then this user device begins to perform a random access procedure in a cell of the target base station 3. This solution is only applicable for a user device with an enhanced radio interface.

These solutions can deal with a potential random access failure. As mentioned before, virtual base station migrations always occur on idle hours like midnight when the number of user devices in the connected state is very small and the base station workload is very light. So the probability that a random access fails is very low. Through the above solutions, it is ensured that a user device will not lose radio connections and may continue its service.

Alternatively, when the service interruption time is greater than 6 milliseconds and less than or equal to 20 milliseconds, the source base station 2 may also configure a DRX cycle for its user devices in the connected state. When the estimated service interruption time is greater than 6 milliseconds and less than or equal to 20 milliseconds, if the random access time slots or the discontinuous receiving are both feasible schemes, the source base station 2 selects one scheme of them to configure for its user devices in the connected state.

When the estimated service interruption time is greater than 20 milliseconds, the source base station 2 configures a DRX cycle for its user devices in the connected state. The user devices in the connected state may be configured with a DRX to save power consumption. A DRX may be divided into an active time period and a sleep time period. A DRX cycle may be configured to be 10 milliseconds, 20 milliseconds . . . 1024 milliseconds, 1280 milliseconds, 2048 milliseconds, and 2560 milliseconds. The active time period may be configured to be 1 millisecond, 2 milliseconds, 3 milliseconds . . . 80 milliseconds, 100 milliseconds and 200 milliseconds. If the service interruption time estimated by the source base station 2 exceeds 20 milliseconds but less than 2560 milliseconds (according to tests, the service interruption time is typically far less than 2560 milliseconds), the source base station 2 may configure a common DRX configuration for all the user devices in the connected state. When all the user devices in the connected state enter a DRX sleep state, the source base station 2 immediately initiates a migration procedure. Because the period of a DRX sleep may be configured to be greater than 2000 milliseconds, there is enough time for a base station migration. After the DRX sleep period, the target base station 3 takes over the source base station 2 and continues to serve these user devices. So these user devices will not be influenced by the migration.

In step S20, the source base station 2 sends a migration request to the target base station 3. Specifically, after selecting a corresponding migration mechanism, the source base station 2 sends to the target base station 3 a migration request which comprises necessary control-plane and user-plane data of the source base station 2 used for the migration. The migrator request causes the target base station 3 to restore data of user devices of the source base station 2. The control-plane data for the migration that needs to be sent by the source base station 2 to the target base station 3 comprises, for example, user device specific parameters and cell specific parameters. The user device specific parameters comprise user device context information, for example, a RRC context, switching limit list, user device history information and user device security information, etc. The cell specific parameters comprise MIB, SIB1-SIB6, etc. The user-plane data for the migration that needs to be sent by the source base station 2 to the target base station 3 comprises RLC-UM/AM DRB and its state, buffered data at RLC layer, buffered data at PDCP layer, HARQ configuration as well as its buffered data and state, etc.

In step S21, during the configured measurement gap or random access procedure or DRX cycle, the target base station 3 receives a migration request from the source base station and restores the data of user devices, such as user device contexts, a RRC context, and various necessary buffered data, for example, hybrid automatic retransmission request configuration and hybrid automatic retransmission request soft buffered data, RLC buffered data, PDCP buffered data and PDCP SN, etc.

In step S22, the source base station 2 and/or the target base station 3 respectively send to the migration manager 1 a migration completion message, which is used for informing the migration manager 1 that the migration of the source base station 2 to the target base station 3 is completed.

Between step S20 and step S21, it is also comprised the process that the source base station 2 sends an in-phase/out-phase (IQ) data path switch message to the IQ Switch and that the IQ data path is switched from the source base station 2 to the target base station 3. In practical application, the switching of the S1/X2 interface mainly comprises the switching of the S1 downlink path. Here, take the switching of the S1 downlink path as an example, it comprises that the source base station 2 sends a downlink path switching request to a mobility management entity, the mobility management entity sends a downlink path update request to a S-GW according to the downlink path switching request, and the S-GW switches the S1 downlink path to the target base station.

Those skilled in the art should understand that the above S1/X2 interface switching manner is merely for an example. Other manners of S1/X2 interface switching which exist presently or might appear in the future, if may be applicable to the present invention, should also be contained within the protection scope of the present invention, and incorporated herein by way of reference.

Figure 3:
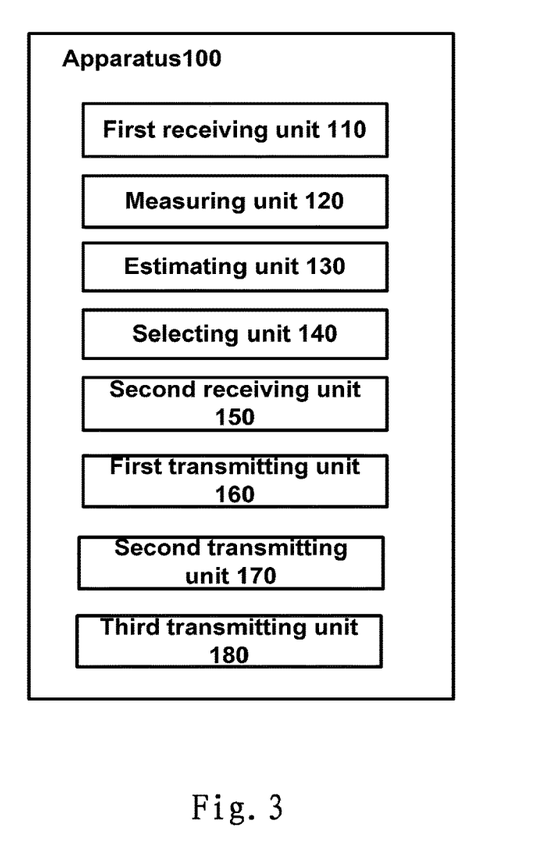
FIG. 3 shows a schematic diagram of an apparatus 100 for implementing virtual base station migration in a BBU pool.

FIG. 3 shows a schematic diagram of an apparatus 100 for implementing a virtual base station migration in a BBU pool. The apparatus 100, for example, may be or may be implemented in the source base station 2 in the implementation as described above in combination with FIG. 1.

As shown in FIG. 3, the apparatus 100 comprises a measuring unit 120 for measuring an available bandwidth between a source base station and a target base station, wherein the source base station and the target base station belong to different baseband units in the BBU pool; an estimation unit 130 for estimating a service interruption time of the source base station according to the number of user devices of the source base station, the data rate of the user devices of the source base station and the measured available bandwidth; and a selecting unit 140 for selecting a migration mechanism of the source base station according to the estimated service interruption time.

In an implementation, the migration mechanism comprises configuring a common measurement gap or random access time slots or a discontinuous receiving cycle for the user devices of the source base station when the estimated service interruption time is lower than or equal to a first threshold; configuring random access time slots or a discontinuous receiving cycle for the user devices of the source base station when the estimated service interruption time is higher than the first threshold and lower than or equal to a second threshold; and configuring a discontinuous receiving cycle for the user devices of the source base station when the estimated service interruption time is higher than the second threshold.

In an implementation, the apparatus 100 further comprises a first receiving unit 110 for receiving a migration preparation message from a migration manager. The migration preparation message is used for triggering the source base station to measure the available bandwidth between the source base station and the target base station.

In an implementation, the apparatus 100 further comprises a first transmitting unit 160 for sending, based on the measured available bandwidth, to the migration manager a migration preparation acknowledgement message for confirming to the migration manager that the source base station is ready for the migration; and a second receiving unit 150 for receiving from the migration manager a migration command message for triggering the migration of the source base station to the target base station.

In an implementation, the apparatus 100 further comprises a second transmitting unit 170 for sending to the target base station a migration request which comprises the control plane and user plane data of the source base station for the migration, wherein the migrator request causes the target base station to restore the context data and buffered data of user devices of the source base station; and a third transmitting unit 180 for sending to the migration manager a migration completion message for informing the migration manager that the migration of the source base station to the target base station is completed.

Figure 4:
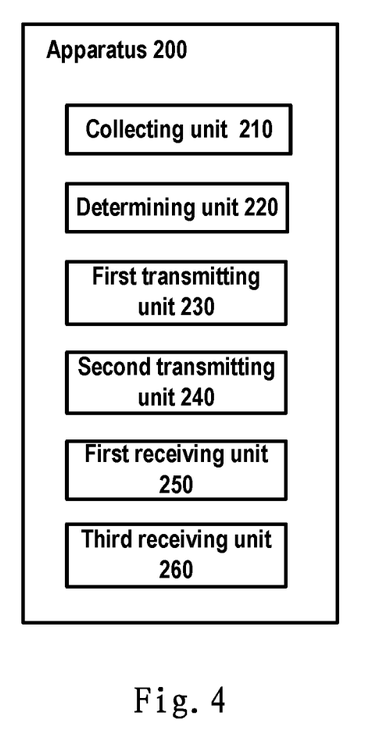
FIG. 4 shows a schematic diagram of an apparatus 200 for implementing virtual base station migration in a BBU pool.

FIG. 4 shows a schematic diagram of an apparatus 200 for implementing a virtual base station migration in a BBU pool. The apparatus 200, for example, may be or may be implemented in the migration manager 1 in the implementation as described above in combination with FIG. 1.

As shown in FIG. 4, the apparatus 200 comprises a collecting unit 210 for collecting resource usage rate of baseband units in the BBU pool; a determining unit 220 for making, in accordance with the collected resource usage rate and a migration threshold, a migration decision comprising determining a source base station and a target base station, wherein the source base station and the target base station belong to different baseband units in the BBU pool; a first transmitting unit 230 for sending a migration preparation message to the source base station and the target base station, to trigger the source base station to measure an available bandwidth between the source base station and the target base station and to initiate the target base station, and sending the migration preparation message to the source base station when the resource usage rate of baseband units of the source base station is lower than the migration threshold; a first receiving unit 250 for receiving a migration preparation acknowledgement message from the source base station and the target base station; a second transmitting unit 240 for sending to the source base station a migration command message for triggering the migration of the source base station to the target base station; and a third receiving unit 260 for receiving migration completion messages from the source base station and/or the target base station.

In an implementation, it is comprised presetting the migration threshold or configuring the migration threshold in accordance with the collected resource usage rate.

For those skilled in the art, it is obvious that the present invention is not limited to the details of above exemplary embodiments. Meanwhile, without departing from the spirit or basic features of the present invention, the present invention can be implemented in other specific forms. Thus, the embodiments should, in any case, be taken as exemplary and non-limiting. In addition, apparently, the words "comprising" and "including" do not exclude other elements and steps, and the expression "a/an" does not rule out the plural form. The multiple elements set out in apparatus claims may also be implemented by one element. The expressions "first" or "second" etc. are used to indicate the name rather than any particular order.

The invention claimed is:

1. A method for a virtual base station migration in a BBU (baseband unit) pool which has multiple baseband units, the method comprising the following performed by a first virtual base station:
    measuring an available bandwidth between the first virtual base station and a second virtual base station, wherein the first virtual base station and the second virtual base station belong to different baseband units in the BBU pool;
    estimating a service interruption time of the first virtual base station;
    selecting a migration mechanism of the first virtual base station in accordance with the estimated service interruption time;
    sending to the second virtual base station a migration request comprising a control plane and user plane data of the first virtual base station for the migration, wherein the migrator request causes the second virtual base station to restore the context data and buffered data of the user devices of the first virtual base station; and
    sending to the migration manager a migration completion message for informing the migration manager that the migration of the first virtual base station to the second virtual base station is completed.

2. The method according to claim 1, wherein the migration mechanism of estimating comprises:
    configuring a common measurement gap or random access time slots or a discontinuous receiving cycle for user devices of the first virtual base station, when the estimated service interruption time is lower than or equal to a first threshold;
    configuring random access time slots or a discontinuous receiving cycle for user devices of the first virtual base station, when the estimated service interruption time is higher than the first threshold and lower than or equal to a second threshold; and
    configuring a discontinuous receiving cycle for user devices of the first virtual base station, when the estimated service interruption time is higher than the second threshold.

3. The method according to claim 1, wherein prior to measuring the method further comprises receiving from a migration manager a migration preparation message for triggering the first virtual base station to measure the available bandwidth between the first virtual base station and the second virtual base station and to initiate the second virtual base station.

4. The method according to claim 1, wherein prior to estimating the method further comprises:
    sending, in accordance with the measured available bandwidth, to a migration manager a migration preparation acknowledgement message for confirming to the migration manager that the first virtual base station is ready for the migration; and
    receiving from the migration manager a migration command message for triggering the migration of the first virtual base station to the second virtual base station.

5. The method according to claim 1, wherein estimating further comprises estimating the service interruption time of the first virtual base station in accordance with the number of the user devices of the first virtual base station, the data rate of the user devices of the first virtual base station and the available bandwidth.

6. A method for a virtual base station migration in a BBU (baseband unit) pool which has multiple baseband units, the method comprising the following performed by a migration manager:
    collecting a resource usage rate of the baseband units in the BBU pool;
    making, in accordance with the collected resource usage rate and a migration threshold, a migration decision comprising determining a first virtual base station and a second virtual base station, wherein the first virtual base station and the second virtual base station belong to different baseband units in the BBU pool;
    sending a migration preparation message to the first virtual base station and the second virtual base station to trigger the first virtual base station to measure an available bandwidth between the first virtual base station and the second virtual base station;

receiving migration preparation acknowledgement messages from the first virtual base station and the second virtual base station;

sending to the first virtual base station a migration command message for triggering the migration of the first virtual base station to the second virtual base station; and receiving migration completion messages from the first virtual base station and the second virtual base station.

7. The method according to claim 6, further comprising presetting the migration threshold or configuring the migration threshold in accordance with the collected resource usage rate.

8. The method according to claim 6, further comprising sending the migration preparation message to the first virtual base station when the resource usage rate of the baseband units of the first virtual base station is lower than the migration threshold.

9. An apparatus for implementing a virtual base station migration in a BBU (baseband unit) pool which has multiple baseband units, the apparatus comprising:
one or more processors configured to:
measure an available bandwidth between a first virtual base station and a second virtual base station, wherein the first virtual base station and the second virtual base station belong to different baseband units in the BBU pool;
estimate a service interruption time of the first virtual base station in accordance with the number of the users of the first virtual base station, the data rate of the user devices of the first virtual base station and the measured available bandwidth; and
select a migration mechanism of the first virtual base station in accordance with the estimated service interruption time; and
a second transmitting unit configured to send to the second virtual base station a migration request comprising the control plane and user plane data of the first virtual base station for the migration, wherein the migrator request causes the second virtual base station to restore the context data and buffered data of the user devices of the first virtual base station; and
a third transmitting unit configured to send to the migration manager a migration completion message for informing the migration manager that the migration of the first virtual base station to the second virtual base station is completed.

10. The apparatus according to claim 9, wherein the migration mechanism comprises:
configuring a common measurement gap or random access time slots or a discontinuous receiving cycle for user devices of the first virtual base station, when the estimated service interruption time is lower than or equal to a first threshold;
configuring random access time slots or a discontinuous receiving cycle for user devices of the first virtual base station UE, when the estimated service interruption time is higher than the first threshold and lower than or equal to a second threshold; and configuring a discontinuous receiving cycle for user devices of the first virtual base station, when the estimated service interruption time is higher than the second threshold.

11. The apparatus according to claim 9, further comprising:
a first receiving unit configured to receive from a migration manager a migration preparation message for triggering the first virtual base station to measure the available bandwidth between the first virtual base station and the second virtual base station;
a first transmitting unit configured to send, in accordance with the measured available bandwidth, to a migration manager a migration preparation acknowledgement message for confirming to the migration manager that the first virtual base station is ready for migration; and
a second receiving unit configured to receive from the migration manager a migration command message for triggering the migration of the first virtual base station to the second virtual base station.

12. An apparatus for implementing a virtual base station migration in a BBU (baseband unit) pool which has multiple baseband units, the apparatus comprising:
one or more processors configured to:
collect a resource usage rate of the baseband units in the BBU pool; and
make, in accordance with the collected resource usage rate and a migration threshold, a migration decision comprising determining a first virtual base station and a second virtual base station, wherein the first virtual base station and the second virtual base station belong to different baseband units in the BBU pool; and
a first transmitting unit configured to send a migration preparation message to the first virtual base station and second virtual base station to trigger the first virtual base station to measure an available bandwidth between the first virtual base station and the second virtual base station and to initiate the second virtual base station, and sending the migration preparation message to the first virtual base station when the resource usage rate of the baseband units of the first virtual base station is lower than the migration threshold;
a first receiving unit configured to receive migration preparation acknowledgement messages from the first virtual base station and the second virtual base station;
a second transmitting unit configured to send to the first virtual base station a migration command message for triggering the migration of the first virtual base station to the second virtual base station; and
a third receiving unit configured to receive migration completion messages from the first virtual base station and/or the second virtual base station.

13. The apparatus according to claim 12, further comprising presetting the migration threshold or configuring the migration threshold in accordance with the collected resource usage rate.

* * * * *